United States Patent
Natanzon et al.

(10) Patent No.: US 9,722,788 B1
(45) Date of Patent: Aug. 1, 2017

(54) REKEYING ENCRYPTED VIRTUAL MACHINES IN A CLOUD

(71) Applicant: EMC Corporation, Hopkinton, MA (US)

(72) Inventors: Assaf Natanzon, Tel Aviv (IL); Saar Cohen, Mishmeret (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 213 days.

(21) Appl. No.: 14/753,758

(22) Filed: Jun. 29, 2015

(51) Int. Cl.
  *H04L 9/32* (2006.01)
  *H04L 9/08* (2006.01)
  *G06F 12/14* (2006.01)
  *H04L 29/06* (2006.01)

(52) U.S. Cl.
  CPC ........ *H04L 9/0891* (2013.01); *G06F 12/1408* (2013.01); *H04L 9/0894* (2013.01); *H04L 63/061* (2013.01); *H04L 63/062* (2013.01); *G06F 2212/1052* (2013.01)

(58) Field of Classification Search
  CPC ... H04L 63/068; H04L 63/062; H04L 9/0894; G06F 2212/1052; G06F 21/6218; G06F 21/80; G06F 2201/815; G06F 2201/84; G06F 9/45533
  USPC ........................................................ 713/171
  See application file for complete search history.

(56) References Cited

U.S. PATENT DOCUMENTS

| | | | |
|---|---|---|---|
| 7,545,940 B2 * | 6/2009 | Alessi | G06F 3/0481 380/239 |
| 7,958,372 B1 * | 6/2011 | Natanzon | G06F 21/80 713/189 |
| 8,370,648 B1 * | 2/2013 | Natanzon | H04L 63/068 380/277 |
| 8,832,399 B1 * | 9/2014 | Natanzon | G06F 3/065 711/112 |
| 9,037,856 B2 * | 5/2015 | Bestler | H04L 9/0863 713/167 |
| 9,152,814 B1 * | 10/2015 | Natanzon | H04L 63/068 |
| 9,225,529 B1 * | 12/2015 | Natanzon | H04L 67/10 |
| 9,529,885 B1 * | 12/2016 | Natanzon | G06F 17/30578 |

FOREIGN PATENT DOCUMENTS

WO    WO 0190928 A1 * 11/2001 ........... G06F 3/0481

* cited by examiner

*Primary Examiner* — Samson Lemma
(74) *Attorney, Agent, or Firm* — Krishnendu Gupta; R. Kevin Perkins

(57) ABSTRACT

A method, system, and computer program product comprising intercepting communication between a virtual machine and encrypted replication data stored on a storage medium and redirecting the communication to a remote replication appliance; and using a key stored on the remote replication appliance to enable the virtual machine to facilitate communication with the encrypted replication data stored on the storage medium; wherein facilitating communication enables the virtual machine to interact with the encrypted replication data as unencrypted data.

12 Claims, 27 Drawing Sheets

REKEYING ENCRYPTED VIRTUAL MACHINES IN A CLOUD

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

RELATED APPLICATIONS

This Application is related to U.S. patent application Ser. No. 14/102,043 entitled "ENCRYPTED VIRTUAL MACHINES IN A CLOUD" filed on Dec. 10, 2013, the teachings of which application is hereby incorporated herein by reference in its entirety.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and computer program product comprising intercepting communication between a virtual machine and encrypted replication data stored on a storage medium and redirecting the communication to a remote replication appliance; and using a key stored on the remote replication appliance to enable the virtual machine to facilitate communication with the encrypted replication data stored on the storage medium; wherein facilitating communication enables the virtual machine to interact with the encrypted replication data as unencrypted data.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
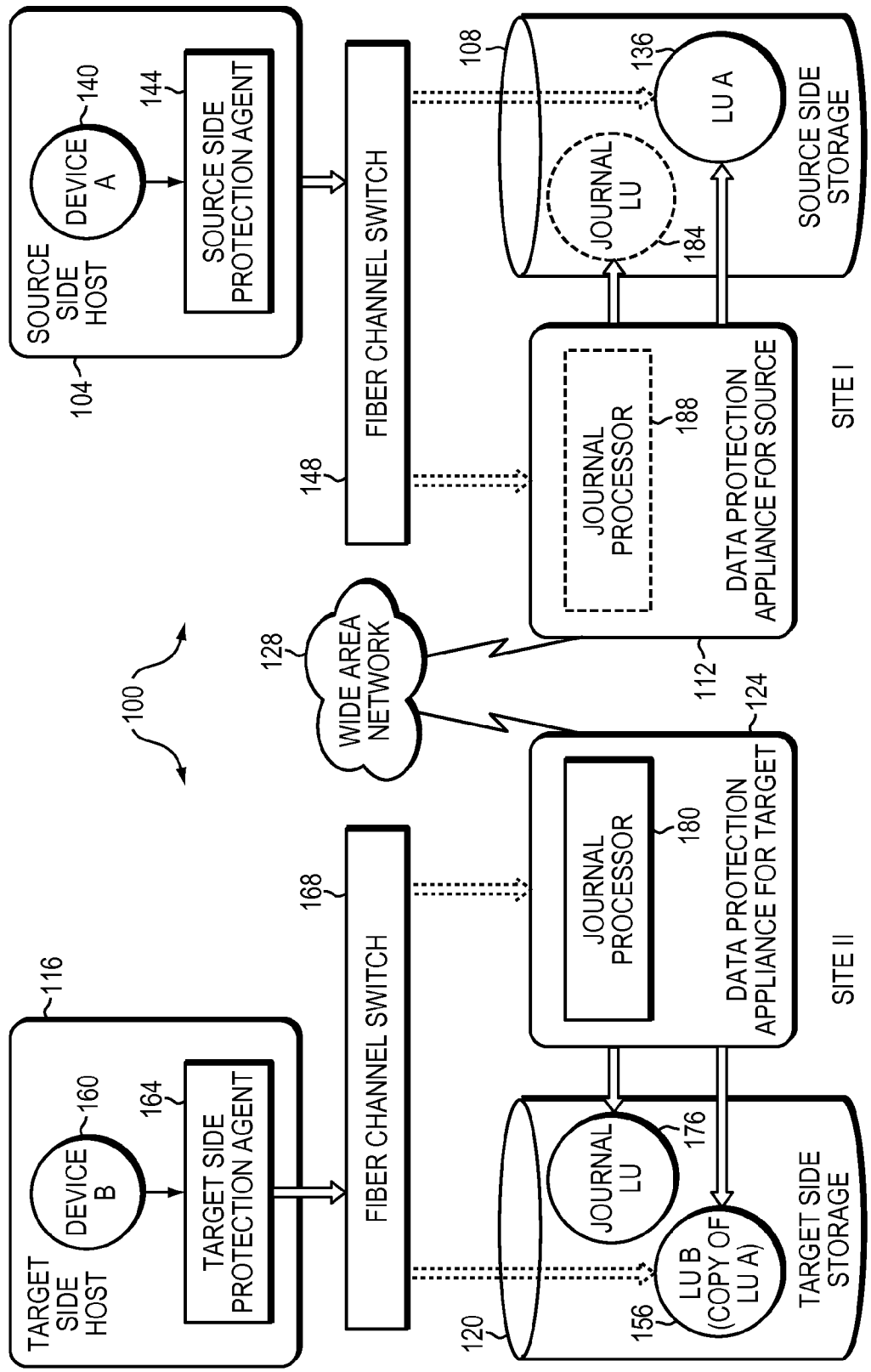
FIG. 1 is a simplified illustration of a data protection system, in accordance with an embodiment of the present disclosure.

Conventional solutions for recovering encrypted virtual machines at a backup site involve storing keys at the backup site. Typically, these solutions require that the keys exist at the backup site at all times, since the encryption solution is not usually integrated with the replication solution. Usually a solution will include encrypting the replication data with a first key, sending the encrypted data to the replica site, decrypting the encrypted data at the replica site, and then writing the data at the replica site to a protected storage which encrypts the data again using a second key. Generally, this introduces a vulnerability since the second key to the storage has to be present at the replica site throughout the replication process, and not only at recovery times.

In certain embodiments, the current disclosure may enable keys to be stored at a backup site when completing recovery of an encrypted virtual machine. In some embodiments, keys may be used to encrypt or decrypt data being sent between a virtual machine and an encrypted storage system. In some embodiments, keys may be stored at a secure location. In particular embodiments, keys may be sent to a replication appliance located at a backup site during recovery of an encrypted virtual machine. In at least some embodiments, a secure location may be a key manager.

In some embodiments of the current disclosure, when there is a failure at a production site that causes a virtual machine to be unable to communicate with storage on the production site, the virtual machine may be accessed on a backup site. In further embodiments, a unique key ID associated with the virtual machine on the production site may be sent to a backup site. In some embodiments, a key ID may be associated with a unique key. In certain embodiments, a unique key may be used by replication protection appliances on production and backup sites to encrypt and decrypt data sent to and from a virtual machine that is associated with the key ID.

In most embodiments the key ID for a virtual machine may be sent from a production site to a replica site and stored at a journal of a replica virtual machine.

In at least some embodiments, during a failure at the production site, a key ID and key may enable a replication protection appliance on a backup site to encrypt and decrypt data sent to and from a virtual machine that is associated with the key ID and thus run the encrypted virtual machine at the replica site.

In certain embodiments, a certificate may also be installed by a user at a backup site upon a failure at a production site. In further embodiments, a certificate may be used by a backup site replication protection appliance to access a key manager.

In particular embodiments, a backup site replication protection appliance may use a certificate and a key ID to access a key manager and retrieve an appropriate key.

In some embodiments, once a backup site replication protection appliance has a key for a virtual machine that is being recovered, it may use the key to decrypt data read from encrypted storage system. In other embodiments, a backup site replication protection appliance may use a key to encrypt data sent from a virtual machine to an encrypted storage system. In some embodiments once a user has finished accessing a virtual machine at a backup site the certificate may be erased from a backup site replication protection appliance.

In further embodiments, the current disclosure may enable rekeying of encrypted data in a public cloud. In certain embodiments, rekeying may occur while access to encrypted data is enabled. In many embodiments, rekeying may occur while replication is occurring. In most embodiments, point in time access to replicated data may be enabled to times before a rekeying started. In other embodiments, point in time access may be enabled while rekeying occurs. In further embodiments, point in time access may be enabled to points in time before a rekey occurred, after completion of a rekeying of replicated data. In most embodiments, a rekeying may be transparent to the ability to access replicated points in time.

In some embodiments, replicating virtual machines in a public cloud may be enabled when data replicated to a cloud must be encrypted. In some embodiments, a splitter may send mirrored IOs to a production replication appliance which encrypts the IOs and may send the encrypted IOs to a replica site.

In certain embodiments, if a user wants to change a key used to encrypt data, it may be necessary to re-copy the data to the replica site again. In some embodiments, there may be no way to re-encrypt the data on the replica site in a case the where a key is not allowed to reach the replica site. In many embodiments, if replication data is being rekeyed and replication is not enabled, a user may lose active replication and there may a period of time without protection of the data.

In certain embodiments, the current disclosure may enable rekeying of encrypted data on a replication site while enabling active replication and point in time access before, during and after the rekeying has started. In certain embodiments, a production RPA may hold 2 keys during a re-keying process. In many embodiments, each bookmark or point in time may have a pointer indicating how much of a volume was already re-keyed, i.e. keyed with a new key, and how much of the volume has not been rekeyed, i.e. keyed with an old key. In many embodiments, a re-keying process may start re-reading a production volume and may send data encrypted with a new key to a replication site. In most embodiments, a replication appliance may track what portion of a replicated volume is encrypted with a first key and what portion of the volume is encrypted with a second key, In certain embodiments, when an IO arrives from a splitter to be replicated, the IO may be encrypted by a new key if the offset or pointer to the location of the IO is to a location on a volume that has been re-keyed. In other embodiments, if an IO arrives from a splitter to be replicated, the IO may be encrypted by an old key if the offset or pointer is to the location of the IO is to a location on a volume that has not been rekeyed.

In some embodiments, if a bookmark corresponding to a point in time is taken during rekeying, metadata may be inserted into a bookmark or into a journal, noting what portion of the replicated data is keyed with a first key and what portion of the replicated data is keyed with a second key. In many embodiments, if a point in time is recovered from a bookmark, the bookmark may indicate what portions of the replicated data is to be unencrypted with a first key and what portion is to be unencrypted with a second key. In some embodiments, one replicated data has been rekeyed with a second key, an old encryption key may not be deleted for a period of time, such as a protection window. In some embodiments, given a first key, a second key, and a set of bookmarks, point in time access may be enabled to many points in time, before the start of a rekeying, during a rekeying, and after a rekeying.

In certain embodiments, when an image is recovered to a production site, the meta data denoting which portion of a volume is encrypted by which key may returned to the production site. In some embodiments, a production site may decrypts data to a first encrypted portion with a first key and data to a second portion with a second key.

The following may be helpful in understanding the specification and claims:

BACKUP SITE—may be a facility where replicated production site data is stored; the backup site may be located in a remote site or at the same location as the production site; a backup site may be a virtual or physical site; a backup site may be referred to alternatively as a replica site or a replication site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines. As used herein, LUN and LU may be used interchangeably to refer to a LU.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site.

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

VIRTUAL VOLUME: may be a volume which is exposed to host by a virtualization layer, the virtual volume may be spanned across more than one site and or volumes VASA: may be a set of vCenter providers that allow an administrator to manage storage VMFS: may be a virtual machine file system, a file system provided by VMware for storing a virtual machine VMDK: may be a virtual machine disk file containing a disk data in a VMFS. Analog to a LUN in a block storage array Virtual RPA (vRPA)/Virtual DPA (vDPA): may be a DPA running in a VM.

VASA may be vSphere Storage application program interfaces (APIs) for Storage Awareness.

MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, and METHODS AND APPARATUS FOR OPTIMAL JOURNALING FOR CONTINUOUS DATA REPLICATION and with U.S. Pat. No. 8,332,687, which are hereby incorporated by reference. A description of synchronous and asynchronous replication may be described in the patent titled DYNAMICALLY SWITCHING BETWEEN SYNCHRONOUS AND ASYNCHRONOUS REPLICATION and with U.S. Pat. No. 8,341,115, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
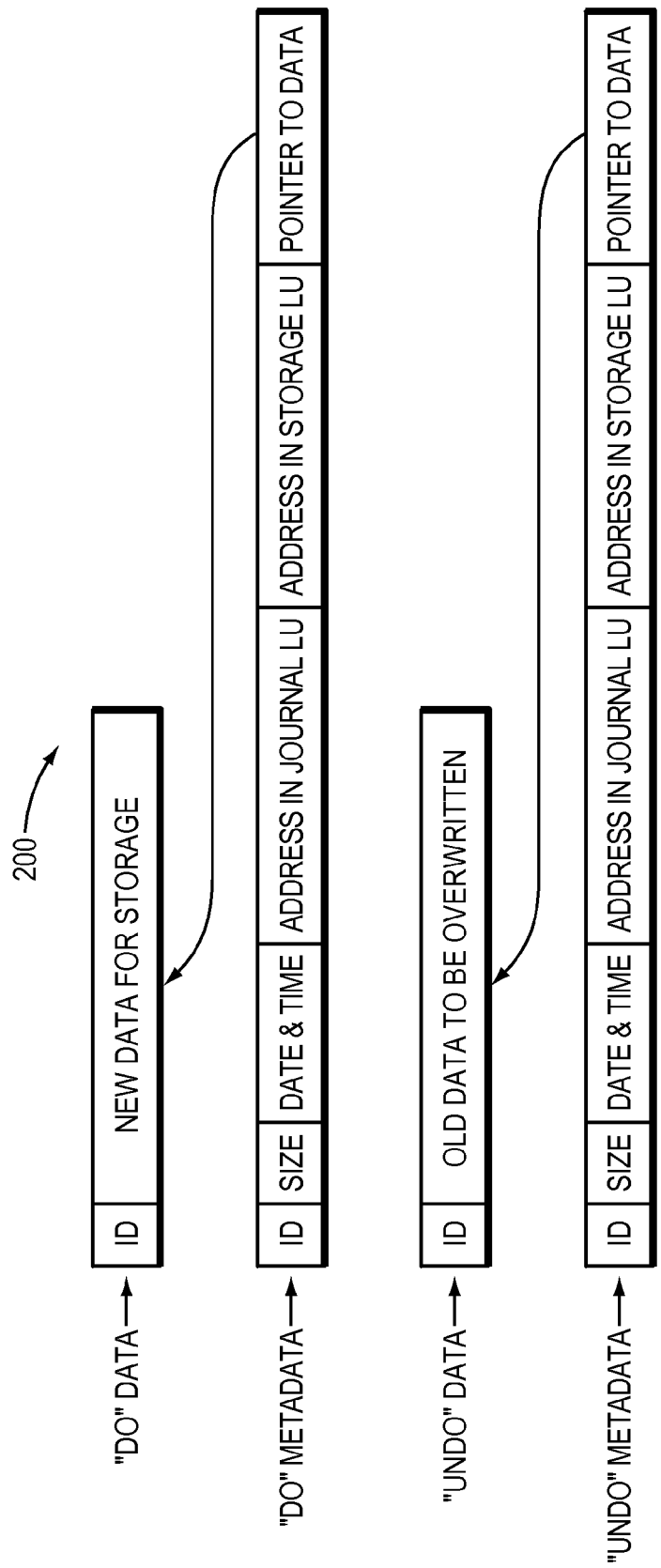
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Figure 3:
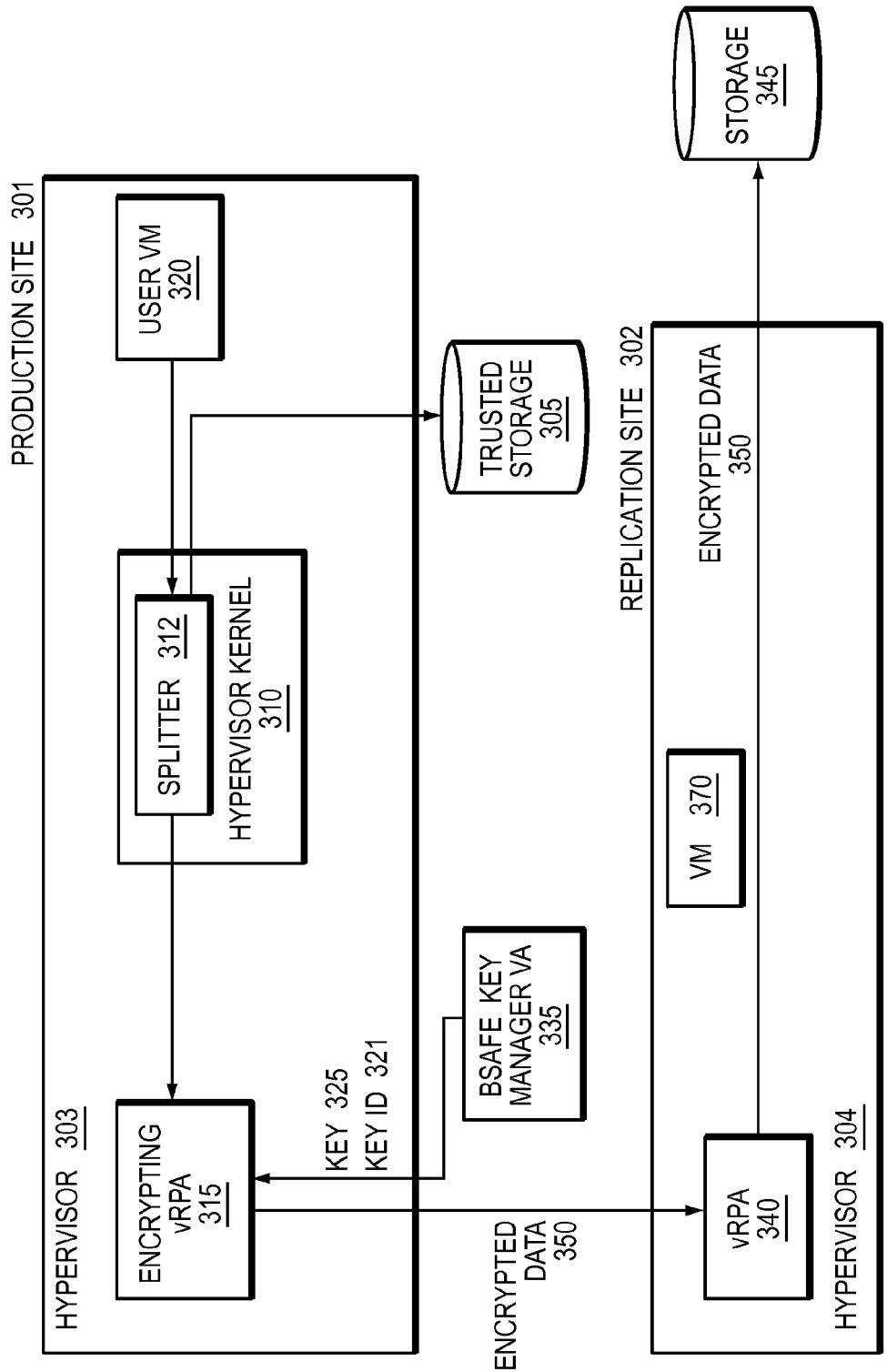
FIG. 3 is a simplified illustration of a secure data replication system, in accordance with an embodiment of the present disclosure.
Figure 13:
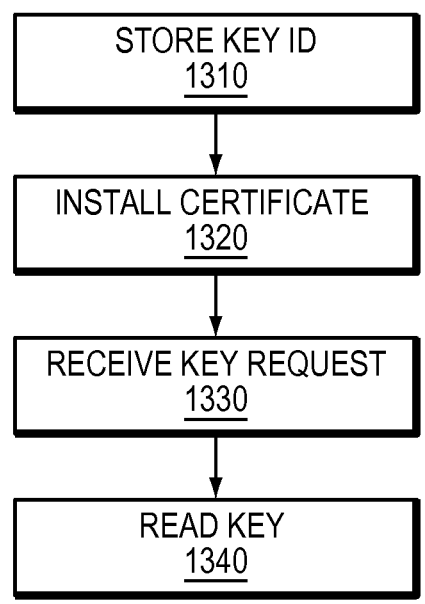
FIG. 13 is a simplified example of a method for obtaining a key at a replica site, in accordance with an embodiment of the present disclosure.

Refer now to the example embodiments of FIGS. 3 and 13. In these example embodiments, user virtual machine (VM) 320 running on hypervisor 303 located on production site 301 is configured for secure replication to replication site 302. When VM 320 is configured for secured replication, a replica VM 370 is generated at replica site 301 with the same configuration of VM 320 on the production site, and a key 325 is generated for VM 320. Key 325 is generated by key manager 335. Key 325 is generated with a unique key ID 321 which may be later used for retrieving key 325 from key manager 335. Key IDs are stored at a replication site journal, which may be for persistency, and in the memory of vRPA 340. Key IDs are also stored at a production site journal on trusted storage 305. Key IDs are also stored on encrypting vRPA 315. Encrypting vRPA 315 also stores a volatile copy of key 325 for encryption (Step 1310).

Key manager 335 stores key 325 corresponding to VM 320 running on hypervisor 303.

While the embodiments in the Figures show a single virtual machine on the production site and the replication site, in certain embodiments, the production site and replication site hypervisors may have multiple virtual machines. In some embodiments, the key manager may likewise store multiple keys corresponding to multiple virtual machines.

Referring back to the example embodiments of FIGS. 3 and 13, when virtual machine 320 sends I/O commands its internal disk, the IO data arrives at hypervisor kernel 310.

In certain embodiments, the internal disk of the virtual machine may be mapped to a VMDK, a file on a NAS system or a raw LUN, or a VVOL. In some embodiments, this data may be unencrypted I/O commands.

Referring again to FIG. 3, splitter 312 on hypervisor kernel 310 intercepts the data and sends is it to its original target, i.e. a VMDK, file or LUN which is stored on trusted storage 305. Splitter 312 also sends the data to encrypting vRPA 315.

In certain embodiments, the trusted storage on the production site may comprise one or more LUs storing VMDKs, raw LUs, VVols, or file systems. In some embodiments, the trusted storage may contain journals for each virtual machine on the production site. In particular embodiments, the journals may be LUs, VMDKs, or VVols.

Referring again to the example embodiments of FIGS. 3 and 13, upon receiving data from VM 320 from splitter 312, encrypting vRPA 315 uses key 325 that corresponds to VM 320. Encrypting vRPA 315 encrypts the data from VM 320 using key 325 it obtained from key manager 335. Key manager 335 may be located on the production site 301, or key manager 335 may be located on a different trusted site than the production site 301, such as a service from RSA.

Encrypting vRPA 315 sends encrypted data 350 to vRPA 340 running on hypervisor 304 on replication site 302. vRPA 340 sends encrypted data 350 to the corresponding volume of VM 370, which may be a VVOL, a file on a file system, a raw LU, or a VMDK on a VMFS on a LU encrypted on storage 345.

Figure 4:
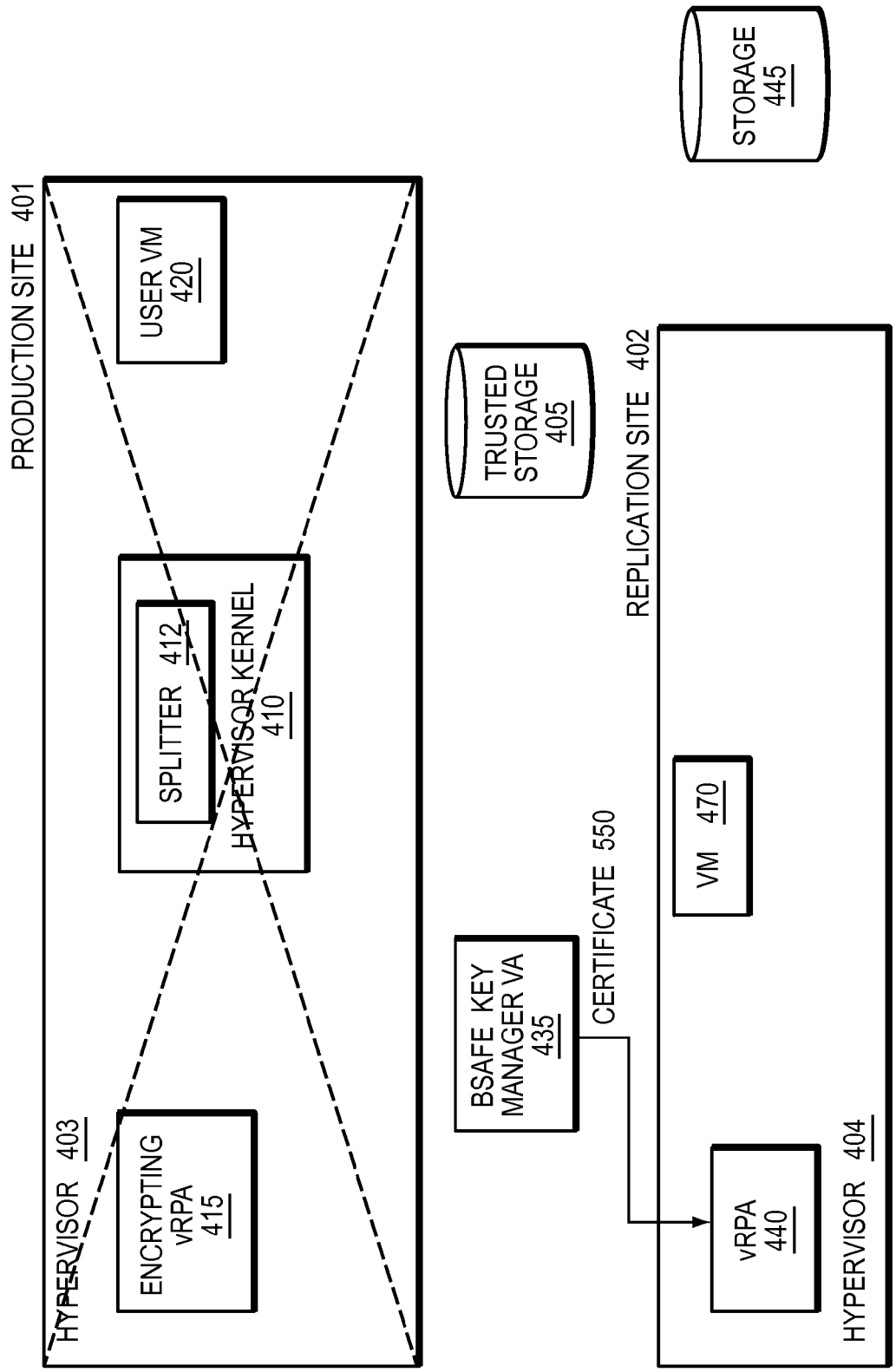
FIG. 4 is a simplified illustration of the secure data replication system of FIG. 3 following a failure at the production site, in accordance with an embodiment of the present disclosure.

Refer now to the example embodiments of FIGS. 4 and 13. In these example embodiments, a failure occurs at production site 401 and storage 405 may no longer be accessible. A user may install certificate 450 to vRPA 440 on replication site 402 (Step 1320). Certificate 450 enables vRPA 440 to access key manager 435.

In some embodiments the system may have multiple tenants, each tenant replicating a set of virtual machines, and having a separate userID configured in the key manager. In certain embodiments, each tenant will be required to install its own certificate which may allow access only to the set of keys belonging to the specific tenant.

Figure 5:
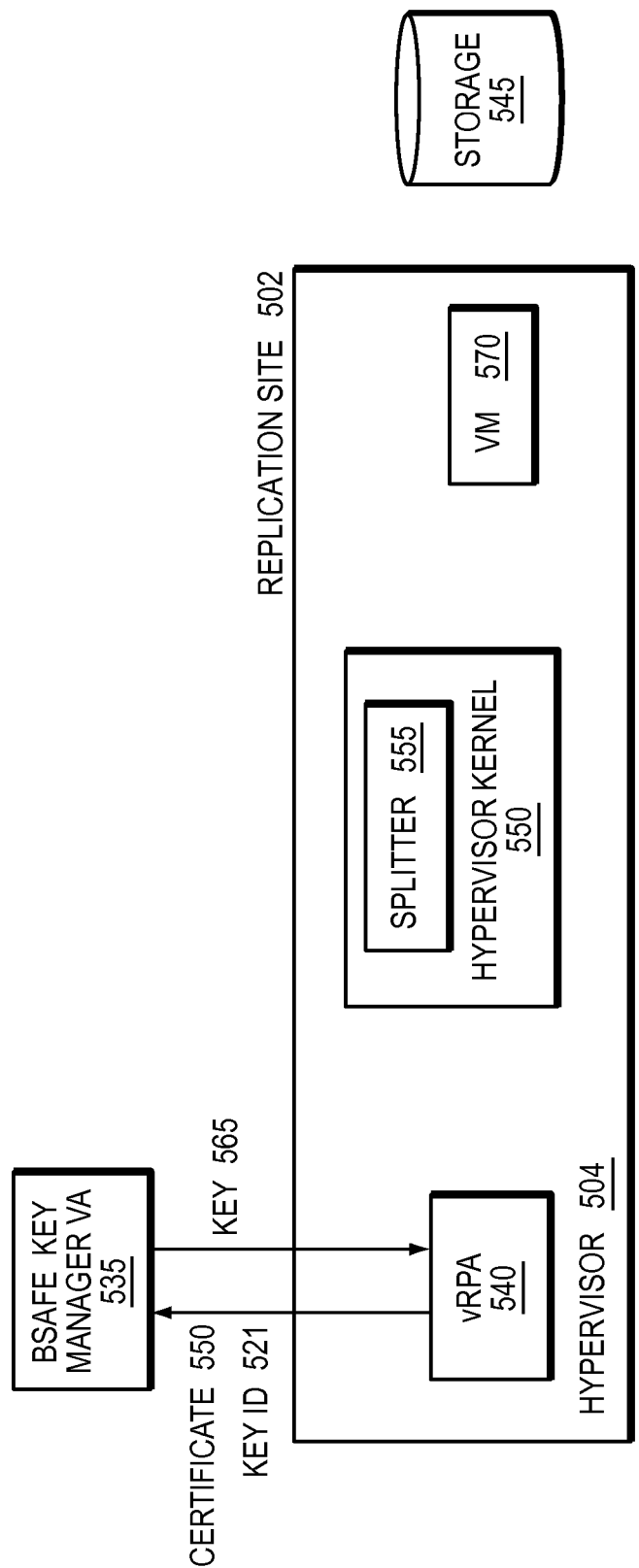
FIG. 5 is a simplified illustration of a replication appliance obtaining a key from a key manager, in accordance with an embodiment of the present disclosure.

Refer now to the example embodiments of FIGS. 5 and 13. In these example embodiments, vRPA 540 requests key 565 from key manager 535 using certificate 550 for authorization and using unique key ID 521 to identify the required key matching VM 370 Step 1330). Key manager 535, upon receiving certificate 550, sends key 565 to vRPA 540 (Step 1340), In certain embodiments, a splitter running on a hypervisor kernel intercepts I/O commands generated by virtual machines and directs them to vRPAs and encrypted storage devices running on the replication site.

Figure 6:
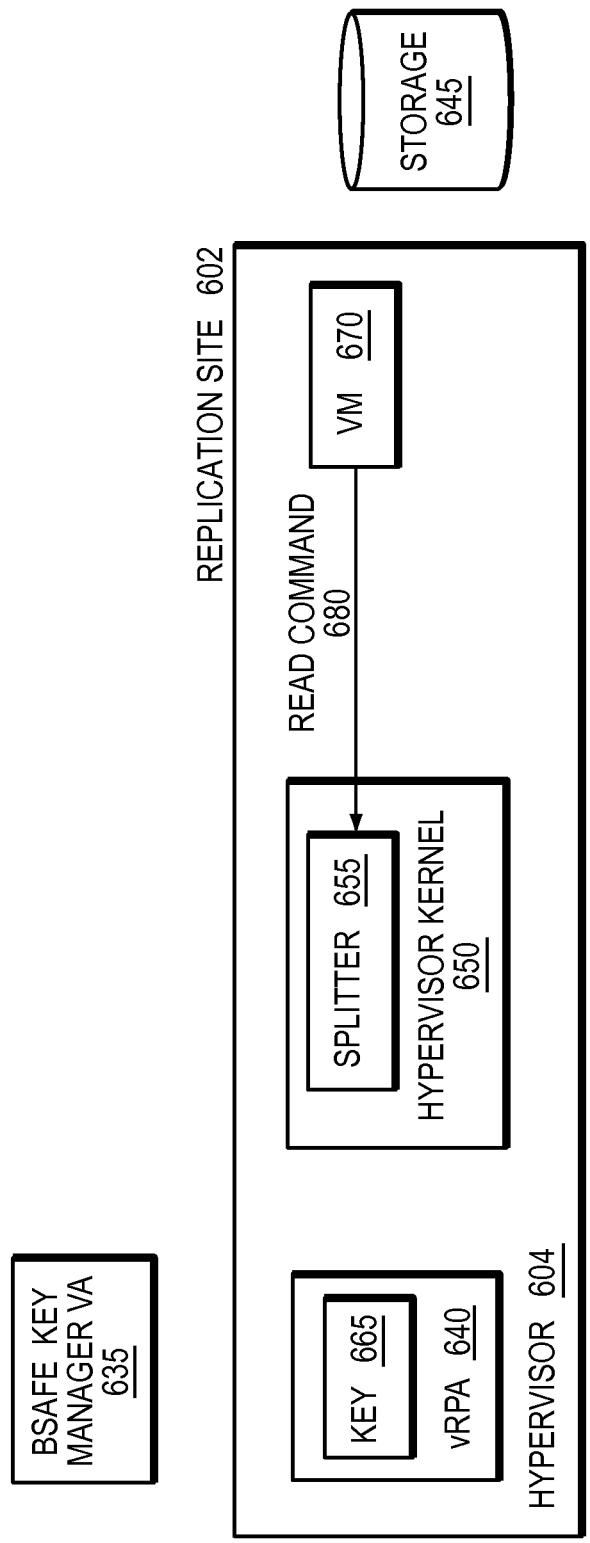
FIG. 6 is a simplified illustration of a splitter intercepting a read command issued from a virtual machine to an encrypted storage medium, in accordance with an embodiment of the present disclosure.
Figure 14:
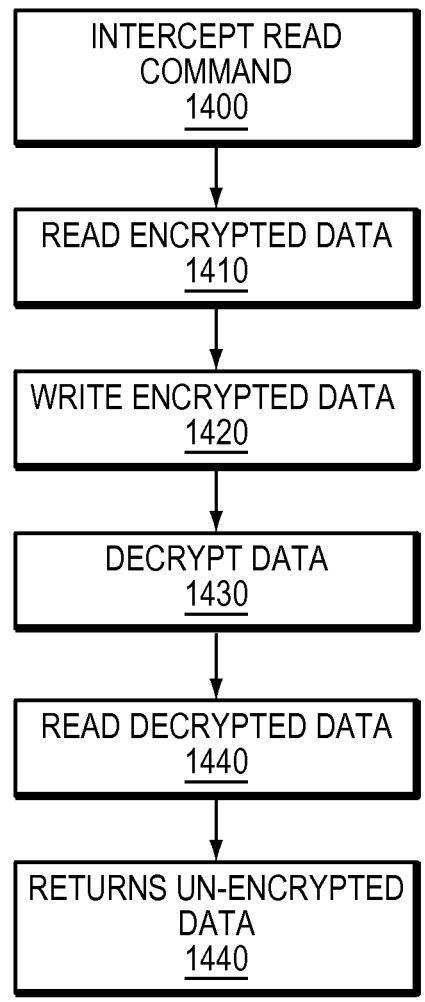
FIG. 14 is a simplified example of a method for decrypting encrypted data from an encrypted storage medium using a replication appliance, in accordance with an embodiment of the present disclosure.

Refer now to the example embodiments of FIGS. 6 and 14, depicting the initiation of a read operation by VM 670. In the example embodiments of FIGS. 6 and 14, VM 670 sends read command 680 to an encrypted volume on storage 645 that is intercepted by splitter 655 (Step 1400).

Figure 7:
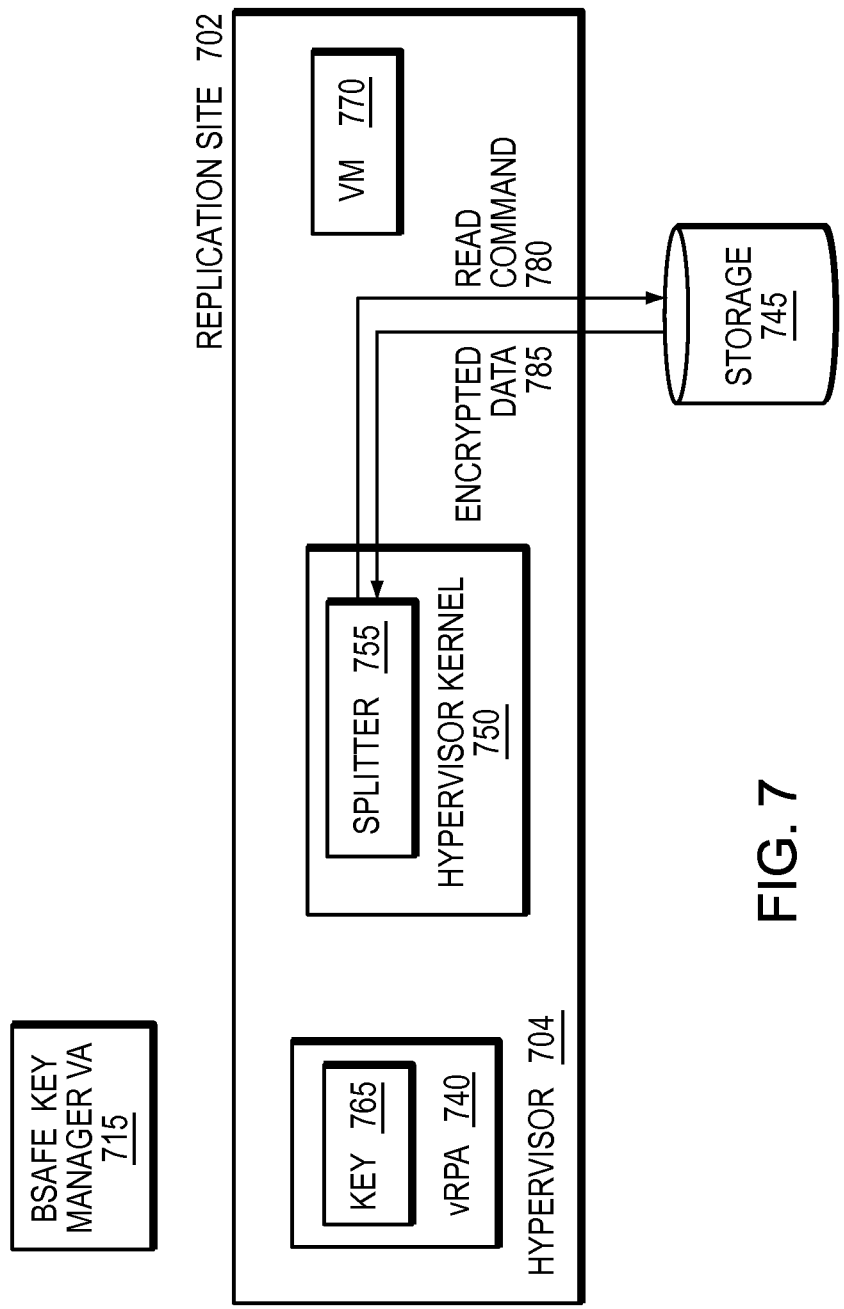
FIG. 7 is a simplified illustration of a splitter sending a read command to an encrypted storage medium and the storage medium returning encrypted data to the splitter, in accordance with an embodiment of the present disclosure.

Refer now to the example embodiments of FIGS. 7 and 14. In these example embodiments, splitter 755 sends read command 780 to the relevant volume, which maybe a VVOL on a VMDK, a file on a file system, a raw LU, or a VMDK on a VMFS on a LU, stored on storage 745. Storage 745 receives read command and sends the requested encrypted data 785 back to splitter 755 (Step 1410).

Figure 8:
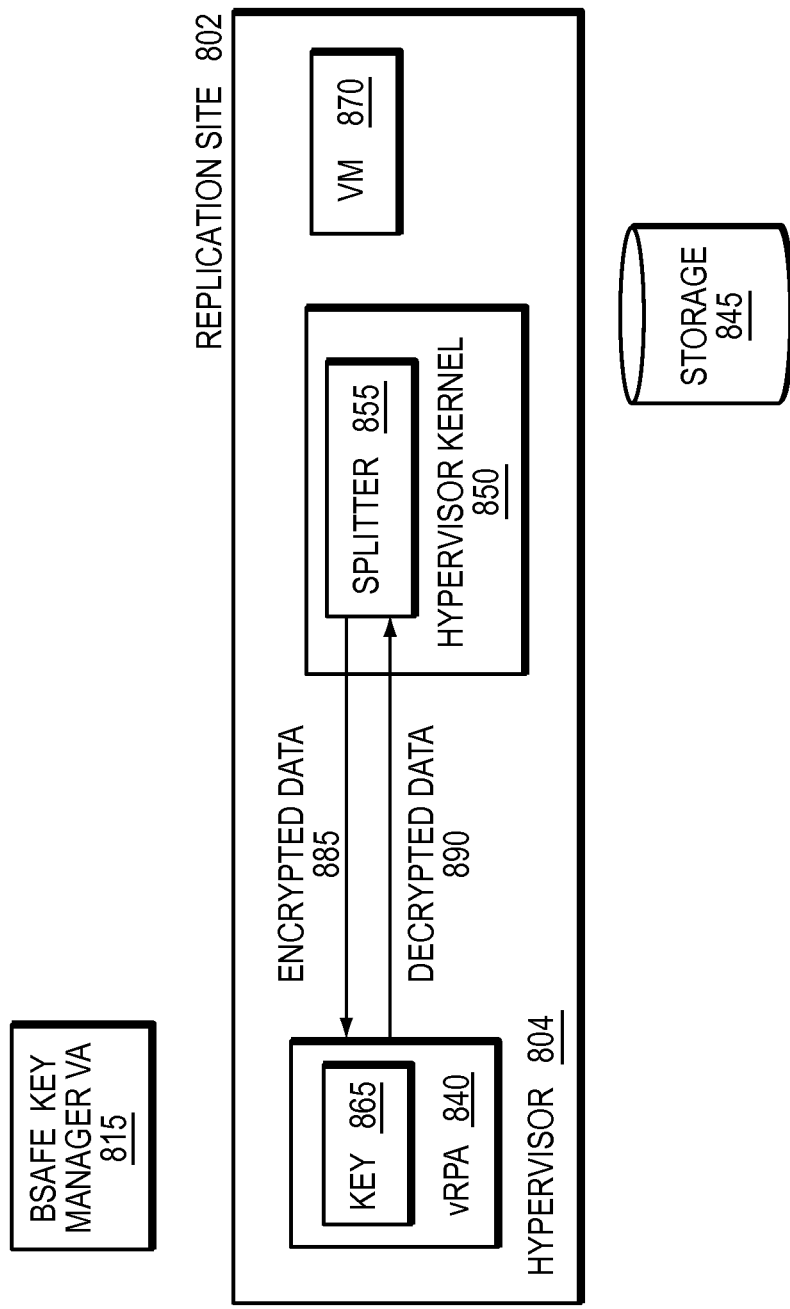
FIG. 8 is a simplified illustration of a replication appliance decrypting encrypted data using a key and returning the decrypted data to a splitter, in accordance with an embodiment of the present disclosure.

Refer now to the example embodiment of FIGS. 8 and 14. In these example embodiments, splitter 855 writes encrypted data 885 that it received from storage 845 to vRPA 840 (Step 1420).

In some embodiments, data may be written to the vRPA as a SCSI command. In certain embodiments, the CDB of a SCSI command may include the offset of the command. In some embodiments, the vRPA may expose an iSCSI target to which the splitter can issue a SCSI command.

In some embodiments, the CDB may be modified from standard CDB and instead of an offset of the SCSI command may include a volume ID for the virtual volume the data is being written to by a virtual machine and a unique ID for the read operation. In one embodiment, the volume ID may be 16 bits. In certain embodiments, an extra bit in the unique ID may be used as a flag indicating if the appliance is require to encrypt or decrypt the data.

Referring back to FIGS. 8 and 14, splitter 855 may change the CDB of the I/O sent to vRPA 840 along with the encrypted data 885. vRPA 840 uses key 865 to decrypt encrypted data 885 and produce decrypted data 890 (Step 1430). Key 865 is selected according to the volume ID encoded in the read operation. Splitter 855 reads decrypted data 890 using a SCSI read command where the read CDB includes the same unique ID instead of the offset bits in the CDB so that the vRPA will know to return decrypted data 890 (Step 1440).

Figure 9:
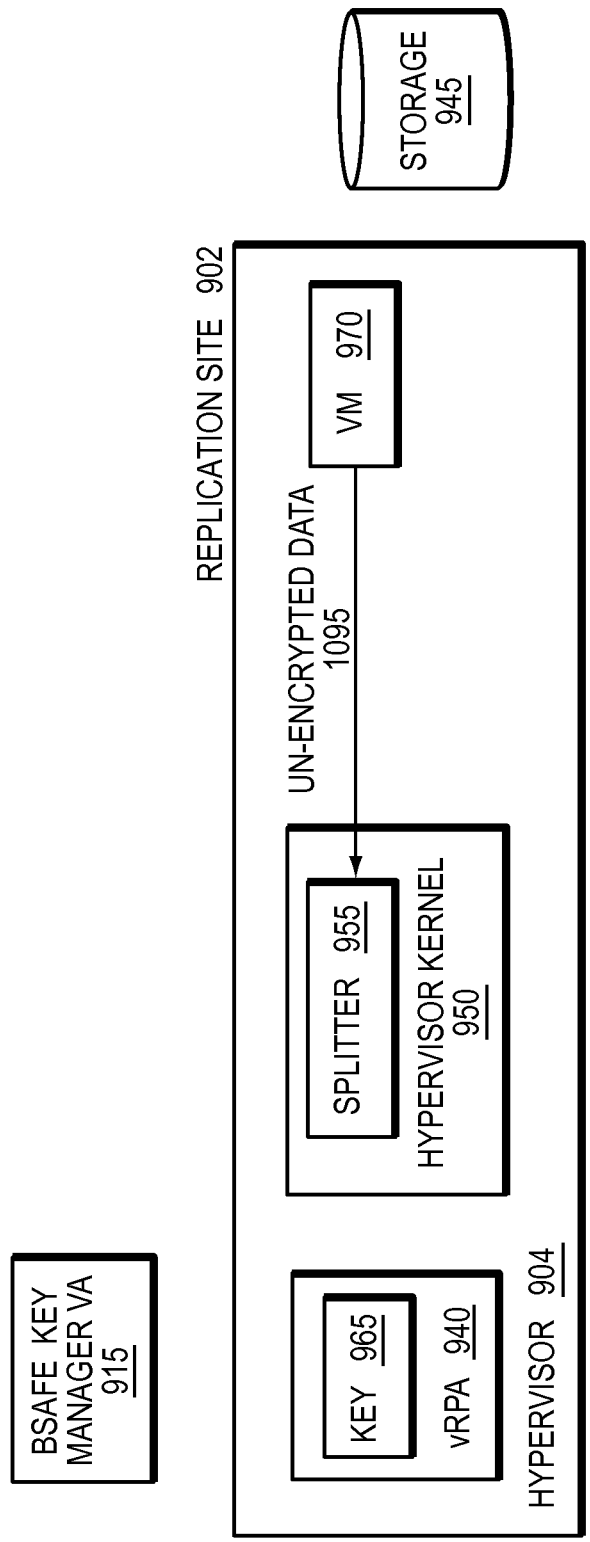
FIG. 9 is a simplified illustration of a splitter returning un-encrypted data to a virtual machine as a SCSI read reply, in accordance with an embodiment of the present disclosure.

Refer now to the example embodiments of FIGS. 9 and 14. In these example embodiments, splitter 955 returns un-encrypted data 995 to VM 970 in a format that VM 970 can interpret (Step 1450). Un-encrypted data 995 may be in the form of a SCSI read reply.

Figure 10:
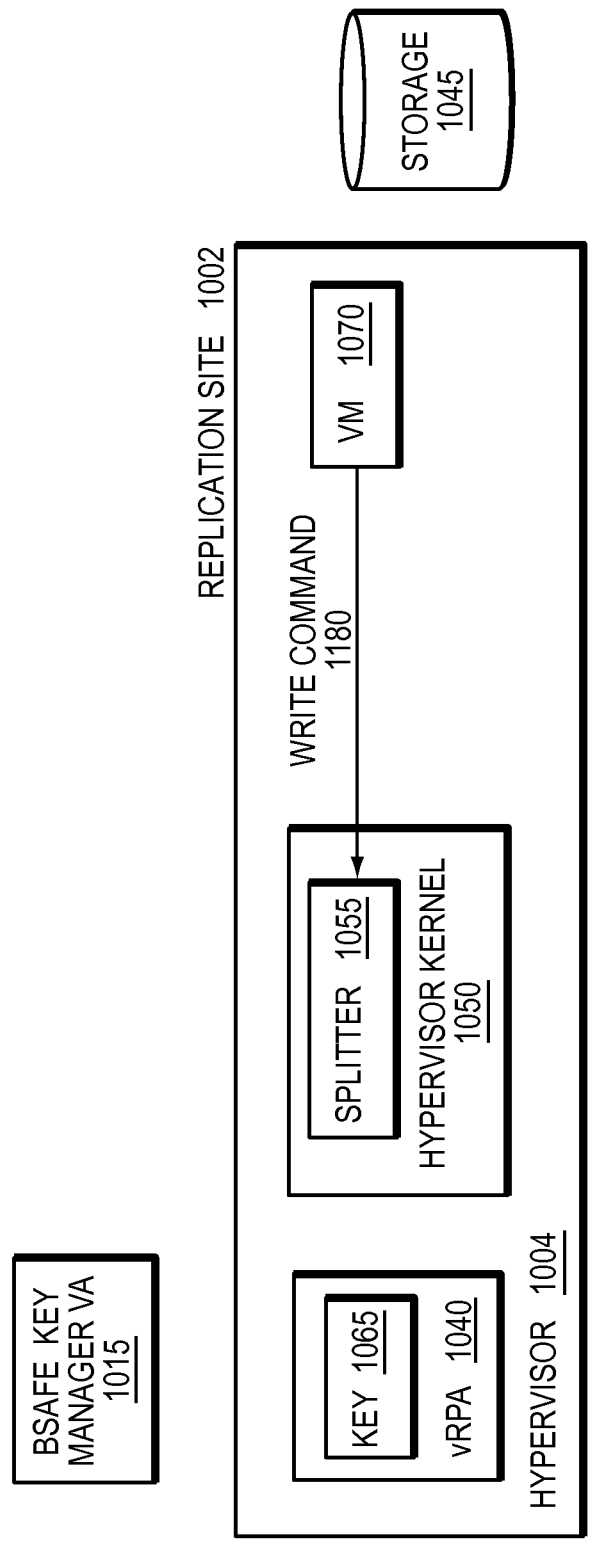
FIG. 10 is a simplified illustration of a splitter intercepting a write command issued from a virtual machine to an encrypted storage medium, in accordance with an embodiment of the present disclosure.
Figure 15:
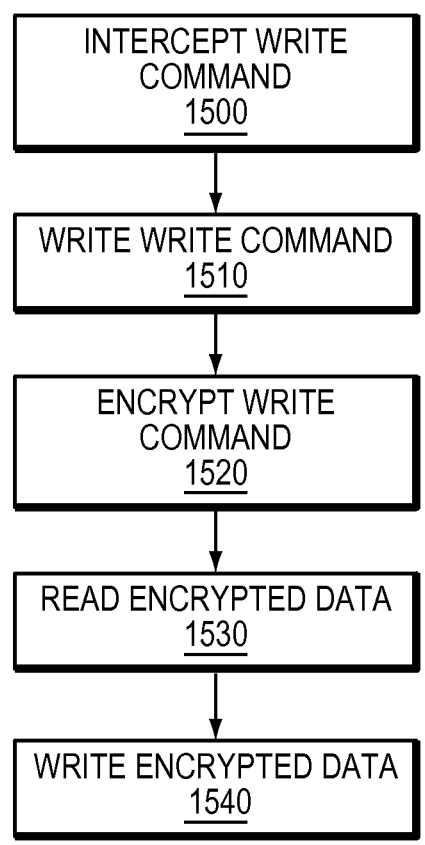
FIG. 15 is a simplified example of a method for encrypting write commands sent to an encrypted storage medium using a replication appliance, in accordance with an embodiment of the present disclosure.

Refer now to the example embodiments of FIGS. 10 and 15, depicting the initiation of a write operation by VM 1070. In the example embodiments of FIGS. 10 and 15, VM 1070 sends SCSI write command 1080 to an encrypted volume in storage 1045 that is intercepted by splitter 1055 (Step 1500).

Figure 11:
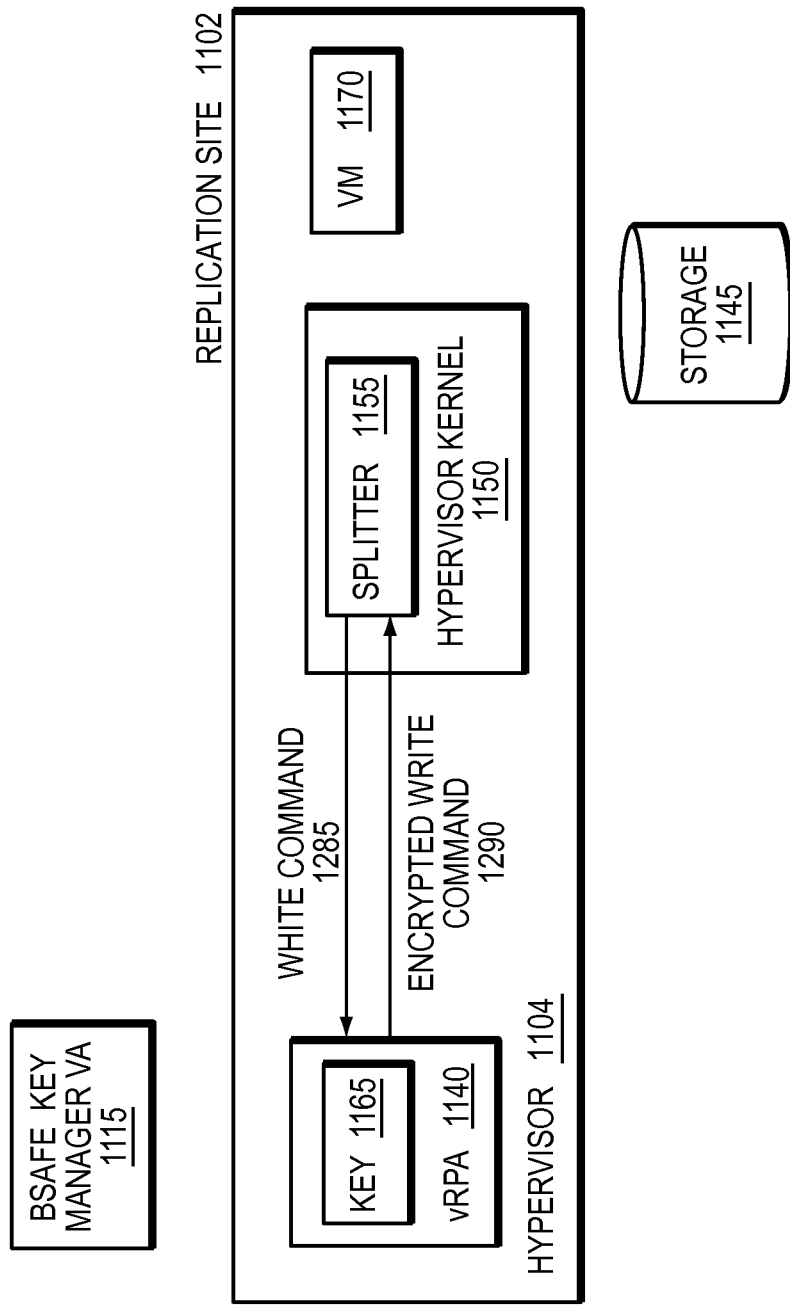
FIG. 11 is a simplified illustration of a replication appliance encrypting a write command using a key and returning the encrypted write command to a splitter, in accordance with an embodiment of the present disclosure.

Refer now to the example embodiment of FIGS. 11 and 15. In the example embodiments of FIGS. 11 and 15, splitter 1155 writes SCSI write command 1185 that it received from VM 1170 to vRPA 1140 (Step 1510). Splitter 1155 may change the CDB in the write to vRPA 1140. In these embodiments, instead of sending the original write offset to vRPA 1140, the CDB and may include a volume ID for the virtual volume in VM 1170 and a unique ID for the write operation.

In some embodiments, the unique ID for the write operation may be 48 bits. In certain embodiments, the unique ID for the write operation may include a bit indicating if the appliance is required to encrypt or decrypt the data to which the I/O is directed.

Referring again to FIGS. 11 and 15, vRPA 1140 uses key 1165 to encrypt write command 1185 (Step 1520). Splitter 1155 sends a read command to vRPA 1140 with the same unique ID in the offset in the CDB to read encrypted write command 1190 back to splitter 1155 (Step 1530).

Figure 12:
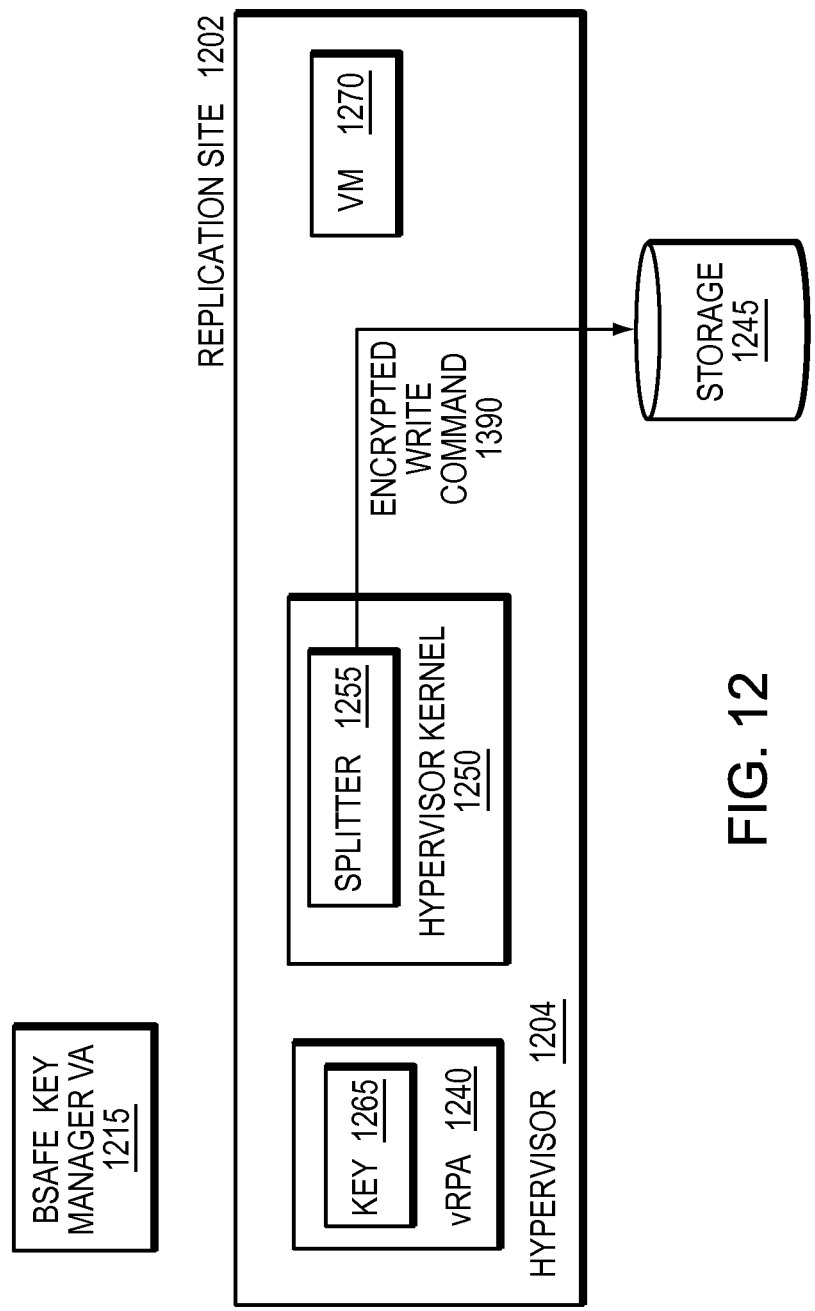
FIG. 12 is a simplified illustration of a splitter sending an encrypted write command to an encrypted storage medium, in accordance with an embodiment of the present disclosure.

Refer now to the example embodiment of FIGS. 12 and 15. In the example embodiments of FIGS. 12 and 15, splitter sends the encrypted write command 1290 to encrypted virtual volume on storage 1245 (Step 1540).

Figure 16:
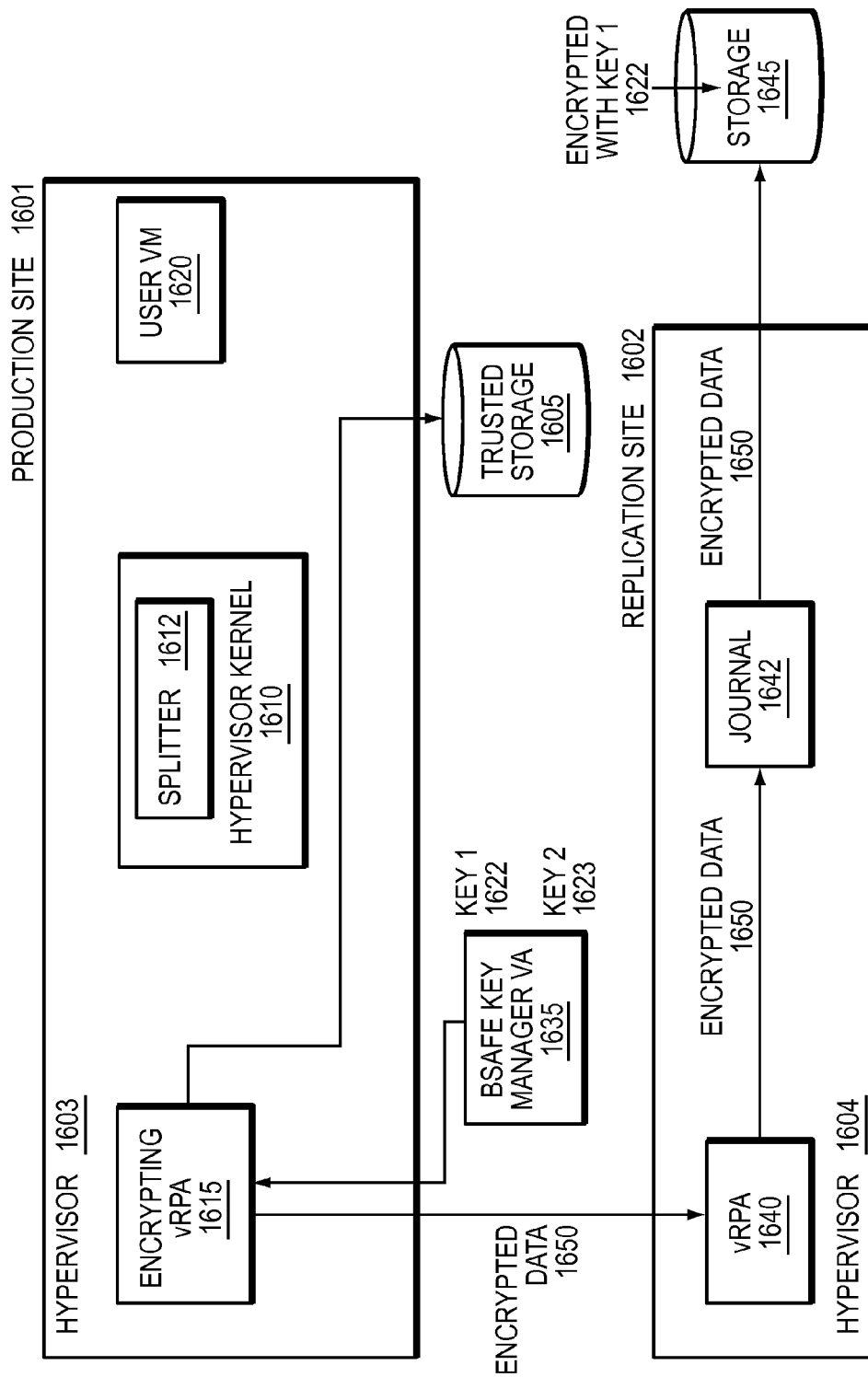
FIG. 16 is a simplified illustration of a start of a rekeying, in accordance with an embodiment of the present disclosure.
Figure 17:
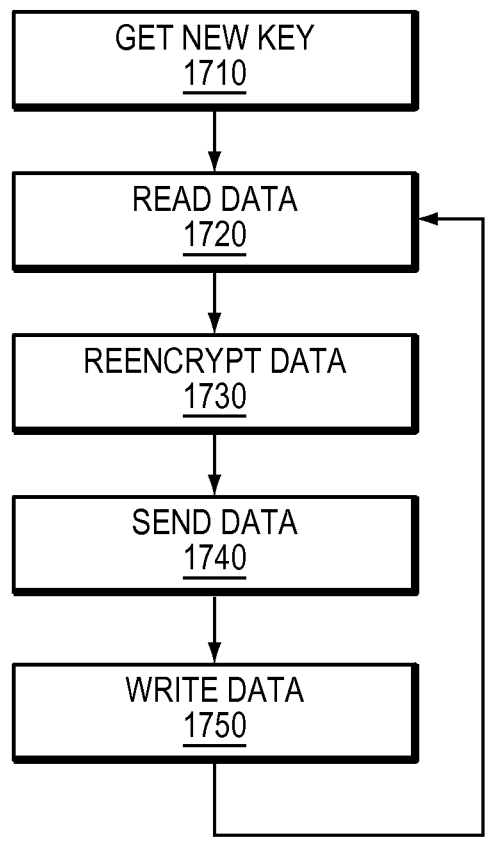
FIG. 17 is a simplified illustration of a method for rekeying storage, in accordance with an embodiment of the present disclosure.

Refer now to the example embodiments of FIGS. 16 and 17, which illustrate the start of a rekeying process. Bsafe Key Manager 1635 has obtained a new key, key 2 1623 (step 1710). Encrypting vRPA 1615 reads data from trusted storage 1605 (step 1720). Encrypting vRPA 1615 encrypts the read data with Key 2 1623 (step 1730). Encrypting vRPA sends data to vRPA 1640 (step 1740). vRPA 1640 writes the new data to journal 642, which is applied from journal 1642 to storage 1645 (step 1750). Note, before rekeying, storage 1645 is encrypted or keyed with Key 1 1622. Encrypting vRPA iterates through steps 1720-1750 reading data and encrypting data until all the data has been rekeyed with Key 2 1623.

Figure 18:
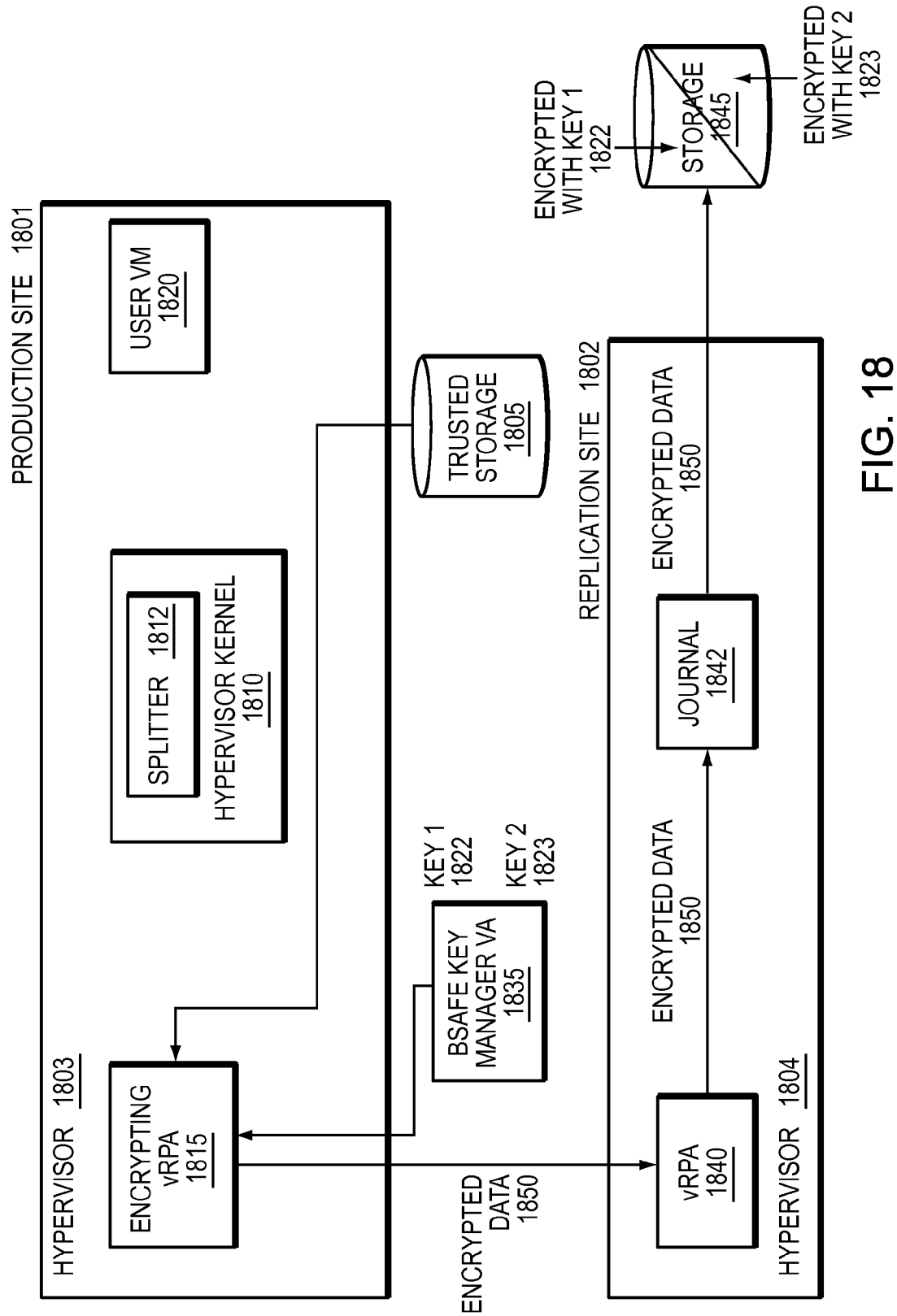
FIG. 18 is a simplified illustration of a partially complete rekeying, in accordance with an embodiment of the present disclosure.

Refer now to the example embodiment of FIG. 18, which illustrates a rekeying in process. In the example embodiment of FIG. 18, part of storage 1845 is encrypted with key 1 1822. Part of storage 1845 is encrypted with key 2 1823. Bsafe Key Manager 1835 holds both key 1 1822 and key 2 1823. Encrypting vRPA 1815 is reading portions of trusted data in storage 1805, rekeying the data with key 2 1823, and sending it to vRPA 1840 to be stored in journal 1842 and then storage 1845. Encrypting vRPA 1815 keeps track of what portion of storage 1845 is keyed with key 1 1822 and what portion of storage 1845 has been keyed with key 2 1823. Note, in other embodiments, an RPA or other device may keep the keys.

Figure 19:
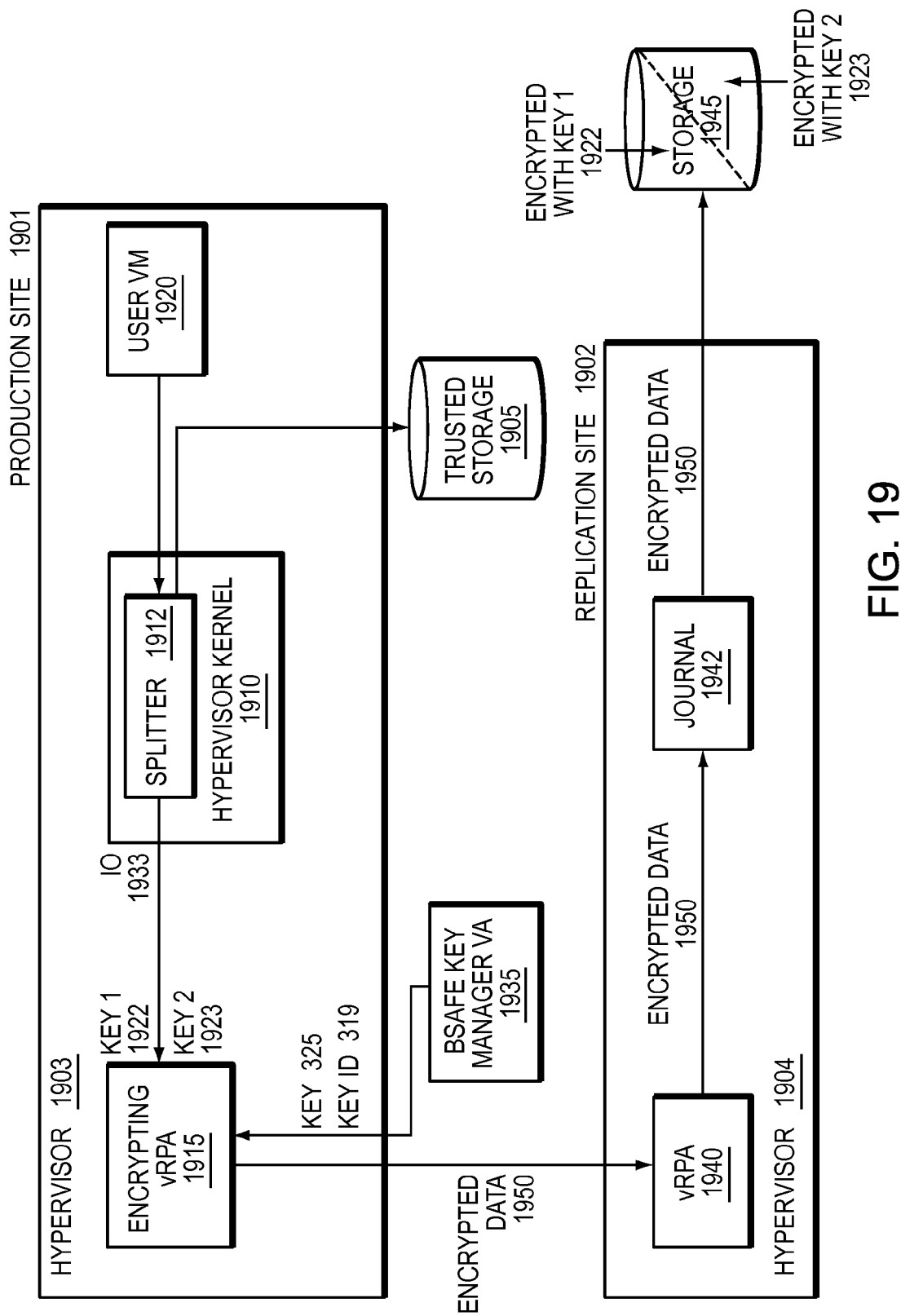
FIG. 19 is a simplified illustration of handling TO during a partially complete rekeying, in accordance with an embodiment of the present disclosure.
Figure 20:
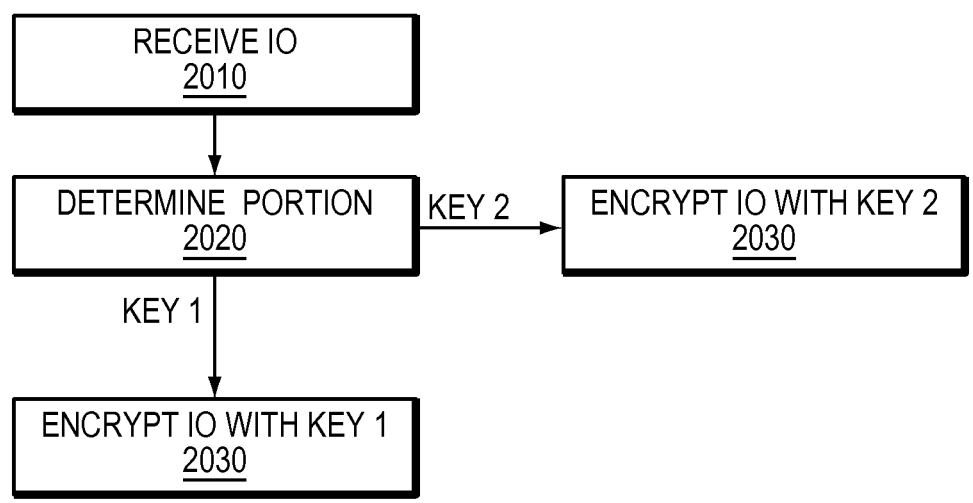
FIG. 20 is a simplified illustration of a method for handling TO during a rekeying, in accordance with an embodiment of the present disclosure.

Refer now to the example embodiments of FIGS. 19 and 20, which illustrate handling IO during a keying process. User VM 1920 has generated IO 1933. Splitter 1912 running on hypervisor 1903 has intercepted IO 1933. Hypervisor 1903 sends a copy of IO 1933 to Encrypting vRPA 1915. Splitter 1912 sends IO to trusted storage 1905. Encrypted vRPA examines IO 1933 to determine where on storage 1945 IO 1933 is directed. At the point in time that IO 1933 is received, a first portion of storage 1945 is encrypted with Key 1 1922 and a second portion of storage 1945 is encrypted with key 2 1923. Encrypting vRPA determines whether IO 1933 is directed to the portion of storage 1945 encrypted with key 1 1922 or the portion of storage 1945 encrypted with key 2 1923 (step 2020). If IO 1933 is directed to the portion of storage 1945 encrypted with Key 1 1922, encrypting vRPA encrypts IO 1933 with Key 1 1922 (step 2030). If IO 1933 is directed to the portion of storage 1945 encrypted with Key 2 1923, encrypting vRPA encrypts IO 1933 with Key 1 1923 (step 2040).

Figure 21:
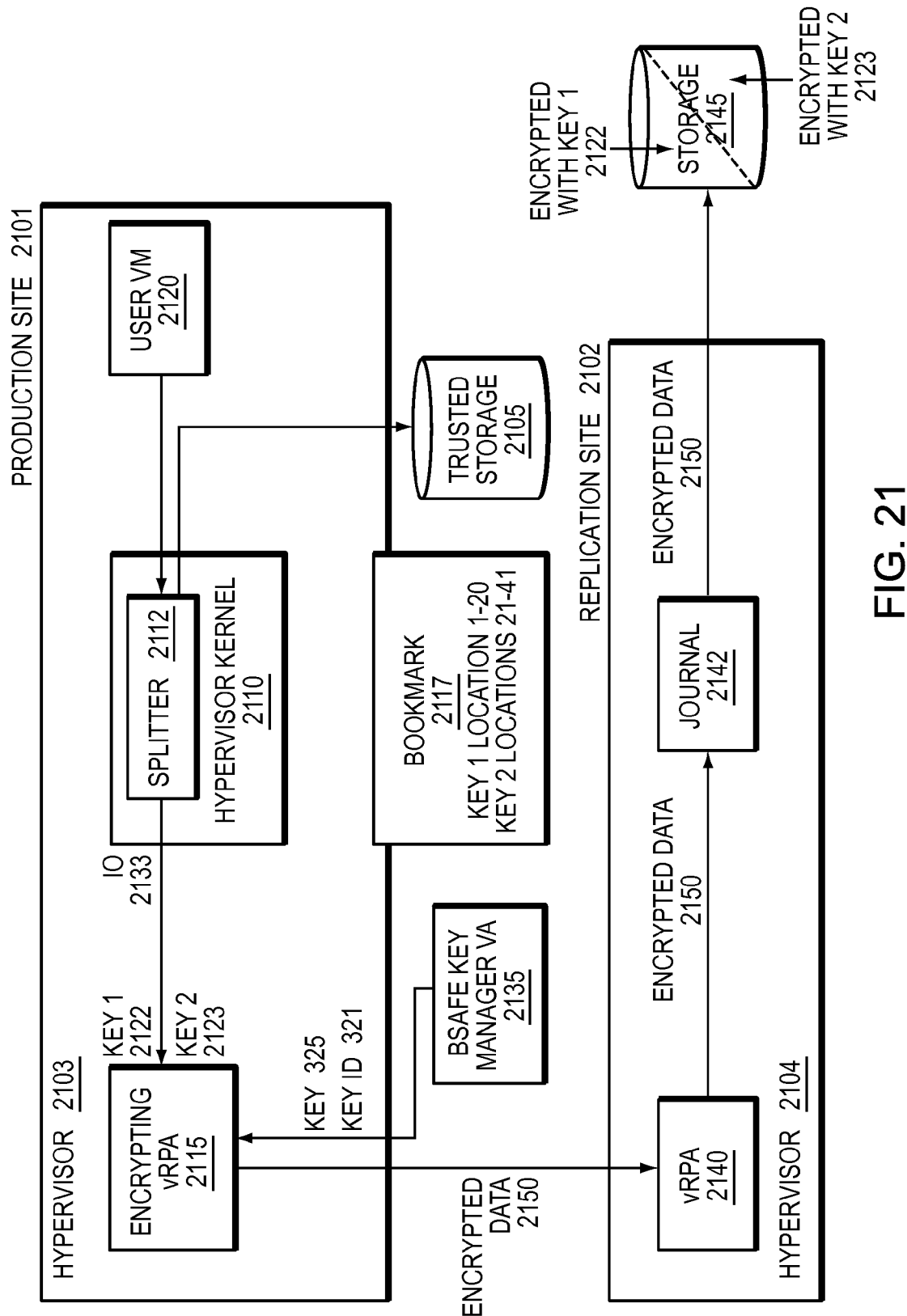
FIG. 21 is a simplified illustration of taking a bookmark during a rekeying process, in accordance with an embodiment of the present disclosure.
Figure 22:
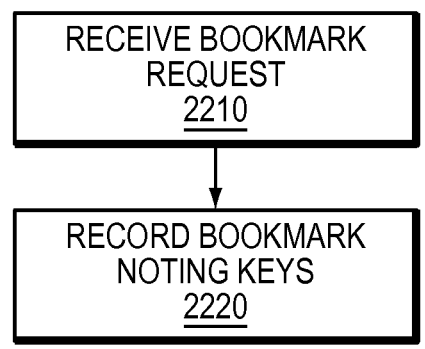
FIG. 22 is a simplified example of a method for taking a bookmark during a rekeying process, in accordance with an embodiment of the present disclosure.

Refer now to the example embodiments of FIGS. 21 and 22, which illustrate taking a bookmark during a rekeying process. In these example embodiments, a portion of storage 2145 is encrypted with key 1 2122 and a portion of storage 21145 is encrypted with key 2 2123. A request is received to make a bookmark corresponding to a point in time (step 2210). Bookmark 2117 is recorded noting what portion of storage 2145 is keyed with key 1 2122 and what portion of storage 2145 is keyed with key 2 2123 (Step 2120).

Figure 23:
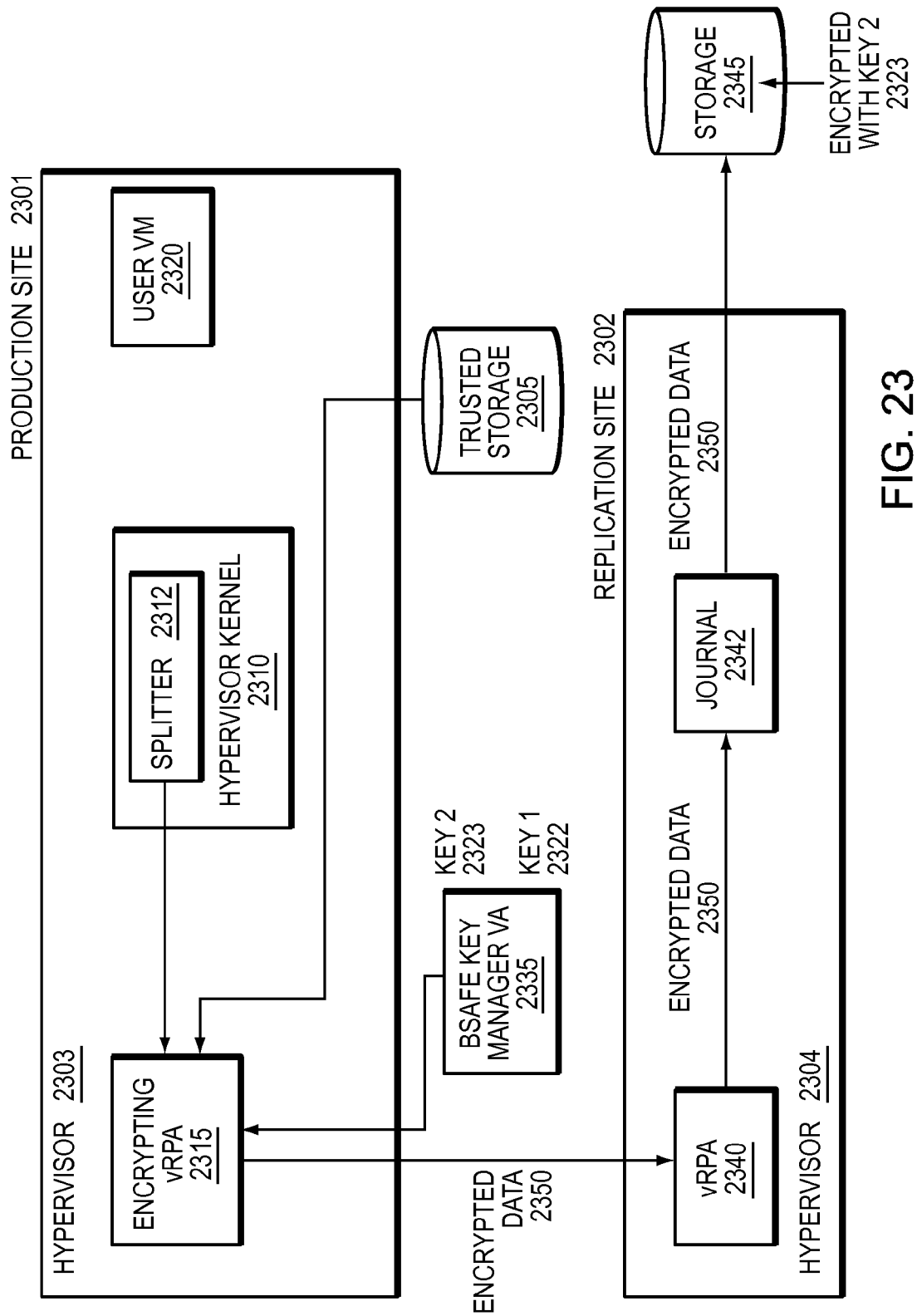
FIG. 23 is a simplified illustration a completed rekeying, in accordance with an embodiment of the present disclosure.

Refer now to the example embodiment of FIG. 23, which illustrates a completed rekeying process. In this embodiment, storage 2345 has been rekeyed with Key 2 2323. The data stored on 2345 is now encrypted with key 2 2323. Bsafe key manager 2335 maintains both key 2 2323 and key 1 2322. This enables previous points in time to be reached where part of storage 2345 was keyed with Key 1 2322. After a period of time, such as the expiration of a given protection window, key 1 2322 may be deleted.

In further embodiments, a particular volume may be keyed and may be rekeyed with more than two keys. In certain embodiments, multiple rekeyings may be occurring at the same time. In further embodiments, once the data in a journal and a volume is encrypted with a new key, the old key may be erased.

Figure 24:
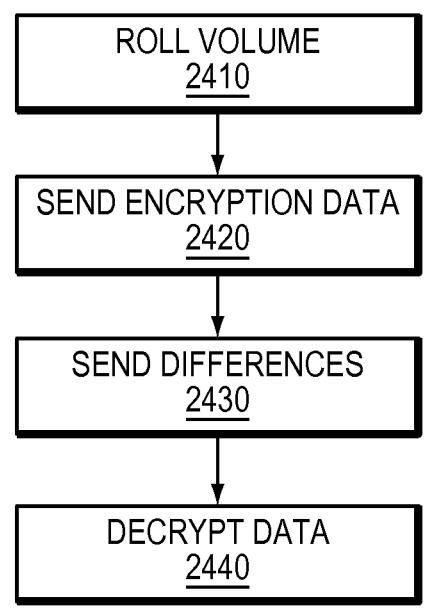
FIG. 24 is a simplified example of a method for recovering an image, in accordance with an embodiment of the present disclosure.

Refer now to the example embodiments of FIGS. 21 and 24, which illustrate restoring production. Replica volume 2145 is rolled using journal 2142 to a requested point in time (step 2410). Bookmark 2117 holds which portion of volume 2145 is encrypted by which key and the encryption data is sen2 to vRPA 2115 (step 2420). The differences between replica volume 2145 and production volume 2105 are sent to production volume 2145 (step 2430). Based on the offset encrypting vRPA 2115 decrypts the data with the correct key, key 1 2122 or key 2 2123 (step 2440).

Figure 25:
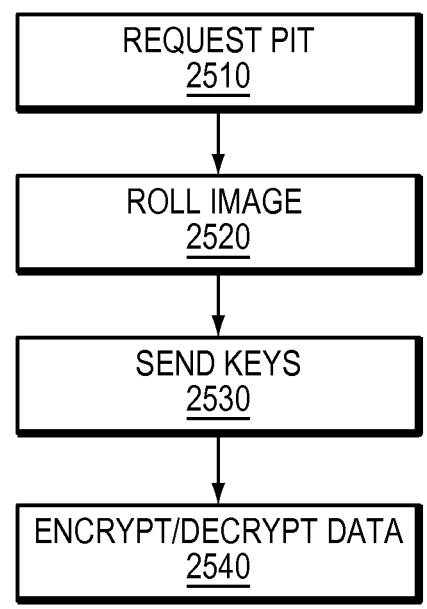
FIG. 25 is a simplified example of a method for image access, in accordance with an embodiment of the present disclosure.

Refer now to the example embodiments of FIGS. 21 and 25, which illustrate an image access. A point of time is requested, such as by a user (step 2510). Using journal 2142, the image 2145 is rolled to the point in time (Step 2520). Encryption keys 2122 and 2123 are sent to replica site 2102 (step 2530). Based on the offset data, the data is encrypted or decrypted with key 1 2122 or key 2 2123 (step 2540).

In certain embodiments, once the user completes testing and running an encrypted virtual machine at the replication site, the user may direct the replication site vRPA to erase the key associated with the relevant virtual machine. In some embodiments, the user may direct the replication site vRPA erase the certificate required to access the key manager. In at least one embodiment, if a certificate has been deleted, further access to the virtual machine data on the replication site storage may require a reinstall of the system. In certain embodiments, the key may be erased from the replication site vRPA if the vRPA does not re-install the certificate at a regular interval.

In other embodiments the user may configure the system to erase the key and certificate at a set period of time. In certain embodiments, the key and certificate may be automatically erased every day. In other embodiments, if a user does not re-issue a certificate at a set period of time, access to the protected data may be lost.

While the figures and descriptions of the figures refer only to a single virtual machine on the production site and the replication site, in certain embodiments, the production site and replication site hypervisors may accommodate multiple virtual machines.

Figure 26:
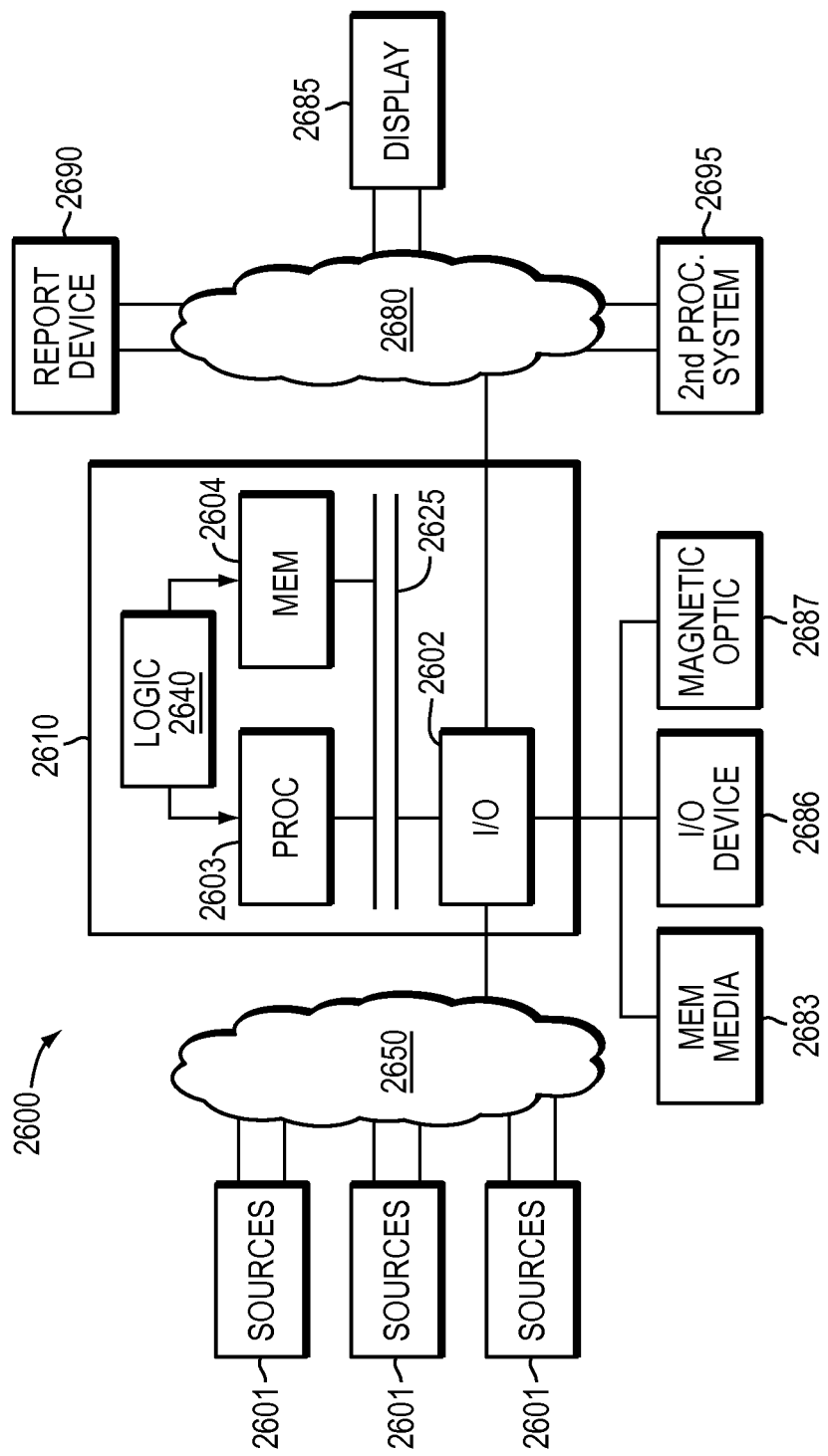
FIG. 26 is an example of an embodiment of an apparatus that may utilize the techniques described herein, in accordance with an embodiment of the present disclosure.
Figure 27:
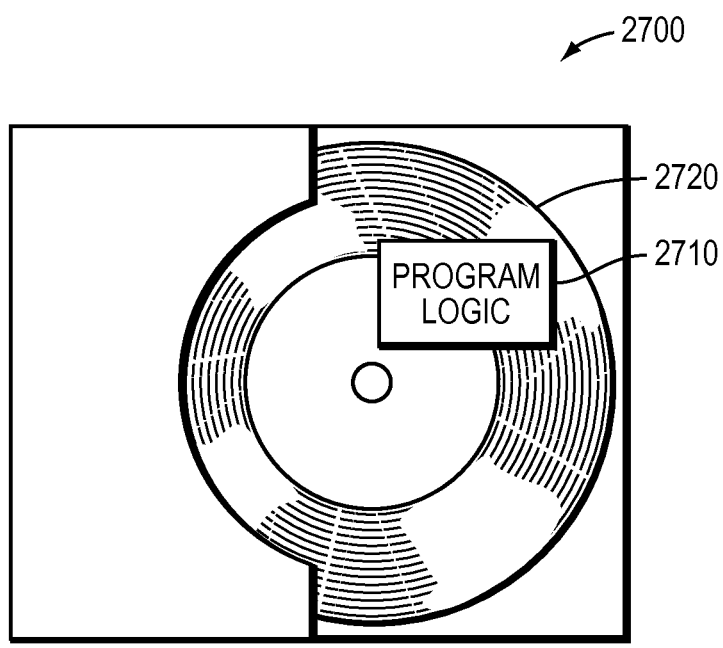
FIG. 27 is an example of an embodiment of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 26, the machine becomes an apparatus for practicing the invention. When implemented on one or more general-purpose processors, the program code combines with such a processor 2603 to provide a unique apparatus that operates analogously to specific logic circuits. As such a general purpose digital machine can be transformed into a special purpose digital machine. FIG. 27 shows Program Logic 2710 embodied on a computer-readable medium 2720 as shown, and wherein the Logic is encoded in computer-executable code configured for carrying out the reservation service process of this invention and thereby forming a Computer Program Product 2700. The logic 2710 may be the same logic 2540 on memory 2504 loaded on processor 2503. The program logic may also be embodied in software modules, as modules, or as hardware modules.

The logic for carrying out the method may be embodied as part of the system described below, which is useful for carrying out a method described with reference to embodiments shown in, for example, FIGS. 13-15, 17, 20, and 22. For purposes of illustrating the present invention, the invention is described as embodied in a specific configuration and using special logical arrangements, but one skilled in the art will appreciate that the device is not limited to the specific configuration but rather only by the claims included with this specification. A processor may be a physical processor or a virtual processor.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system comprising:
    encrypted storage encrypted with a first encryption key; and computer-executable logic operating and stored in memory, wherein the computer-executable program logic is configured to enable execution across one or more hardware processors of:
    reading a portion of data from a production image on a production site;
    encrypting the data with a second encryption key;
    writing the data to encrypted storage on a replication site; wherein the data overwrites a portion of the encrypted storage on the replication site; wherein the portion of the encrypted storage was previously encrypted with the first encryption key;
    tracking what portions of the encrypted storage are encrypted by the first encryption key and what portions of the encrypted storage are encrypted by the second encryption key;
    the executable program logic is configured to enable execution of:
    determining to what portion of a first portion and a second portion of the encrypted storage a received IO is directed; wherein a first portion of the encrypted storage is encrypted with the first key and the second portion is encrypted with the second key; and encrypting the IO with the key corresponding to the portion of the encrypted storage the IO is directed.

2. The system of claim 1 wherein the executable program logic is configured to enable execution of:
receiving a request to take a bookmark; and
taking a bookmark; wherein the bookmark includes information indicating what portion of the encrypted storage is encrypted with the first key and what portion of the encrypted storage is encrypted with the second key.

3. The system of claim 2 wherein the executable program logic is configured to enable execution of:
receiving a request to access the bookmark; and
rolling the encrypted storage to a point in time recorded in the bookmark.

4. The system of claim 2 wherein the executable program logic is configured to enable execution of:
sending the first key and the second key to the replication site; and
decrypting the data with the appropriate key of the keys.

5. A computer implemented method implemented across at least a portion of one or more hardware processors, the method comprising:
reading a portion of data from a production image on a production site;
encrypting the data with a second encryption key;
writing, by the at least portion of one or more of the hardware processors, the data to encrypted storage on a replication site; wherein the data overwrites a portion of the encrypted storage on the replication site; wherein the portion of the encrypted storage was previously encrypted with the first encryption key;
tracking what portions of the encrypted storage are encrypted by the first encryption key and what portions of the encrypted storage are encrypted by the second encryption key;
determining to what portion of a first portion and a second portion of the encrypted storage a received IO is directed; wherein a first portion of the encrypted storage is encrypted with the first key and the second portion is encrypted with the second key; and
encrypting the IO with the key corresponding to the portion of the encrypted storage the IO is directed.

6. The method of claim 5 further comprising:
receiving a request to take a bookmark; and
taking a bookmark; wherein the bookmark includes information indicating what portion of the encrypted storage is encrypted with the first key and what portion of the encrypted storage is encrypted with the second key.

7. The method of claim 6 further comprising:
receiving a request to access the bookmark; and
rolling the encrypted storage to a point in time recorded in the bookmark.

8. The method of claim 6 further comprising:
sending the first key and the second key to the replication site; and
decrypting the data with the appropriate key of the keys.

9. A computer program product comprising:
a non-transitory computer readable medium encoded with computer executable program code, wherein the code enables execution by one or more hardware processors of:
reading a portion of data from a production image on a production site; encrypting the data with a second encryption key;
writing the data to encrypted storage on a replication site; wherein the data overwrites a portion of the encrypted storage on the replication site; wherein the portion of the encrypted storage was previously encrypted with the first encryption key;
tracking what portions of the encrypted storage are encrypted by the first encryption key and what portions of the encrypted storage are encrypted by the second encryption key;
determining to what portion of a first portion and a second portion of the encrypted storage a received IO is directed; wherein a first portion of the encrypted storage is encrypted with the first key and the second portion is encrypted with the second key; and
encrypting the IO with the key corresponding to the portion of the encrypted storage the IO is directed.

10. The computer program product of claim 9 the code further enabling:
receiving a request to take a bookmark; and
taking a bookmark; wherein the bookmark includes information indicating what portion of the encrypted storage is encrypted with the first key and what portion of the encrypted storage is encrypted with the second key.

11. The computer program product of claim 10 the code further enabling:
receiving a request to access the bookmark; and
rolling the encrypted storage to a point in time recorded in the bookmark.

12. The computer program product of claim 10 the code further enabling:
sending the first key and the second key to the replication site; and
decrypting the data with the appropriate key of the keys.

* * * * *